(12) United States Patent
Shin et al.

(10) Patent No.: US 6,389,417 B1
(45) Date of Patent: May 14, 2002

(54) METHOD AND APPARATUS FOR SEARCHING A DIGITAL IMAGE

(75) Inventors: Hyun-doo Shin, Sungnam; Yang-lim Choi, Suwon, both of (KR); B. S. Manjunath, Santa Barbara, CA (US)

(73) Assignees: Samsung Electronics Co., Ltd., Kyungki-Do (KR); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/342,270

(22) Filed: Jun. 29, 1999

(51) Int. Cl.⁷ .............................................. G06F 17/30
(52) U.S. Cl. ........................ 707/6; 707/2; 707/3; 707/4; 707/5
(58) Field of Search ................................ 707/2, 3, 4, 5, 707/6

(56) References Cited

U.S. PATENT DOCUMENTS

| | | | | |
|---|---|---|---|---|
| 4,680,803 A | * | 7/1987 | Dilella | 382/140 |
| 4,731,606 A | * | 3/1988 | Bantz et al. | 345/118 |
| 4,989,258 A | * | 1/1991 | Takahashi et al. | 382/226 |
| 5,159,647 A | * | 10/1992 | Burt | 382/103 |
| 5,200,841 A | * | 4/1993 | Kotaki et al. | 358/455 |
| 5,337,403 A | * | 8/1994 | Klingman | 395/140 |
| 5,360,968 A | * | 11/1994 | Scott | 235/454 |
| 5,502,495 A | * | 3/1996 | Bannai et al. | 358/447 |
| 5,509,111 A | * | 4/1996 | Hong et al. | 395/131 |
| 5,832,115 A | * | 11/1998 | Rosenberg | 382/199 |
| 5,859,921 A | * | 1/1999 | Hoffman | 707/4 |
| 5,867,277 A | * | 2/1999 | Melen et al. | 358/296 |
| 5,901,248 A | * | 5/1999 | Fandrianto et al. | 382/236 |
| 5,969,766 A | * | 10/1999 | Kin | 348/413 |
| 5,987,456 A | * | 11/1999 | Ravela et al. | 707/5 |
| 6,005,981 A | * | 12/1999 | Ng et al. | 382/240 |
| 6,014,671 A | * | 1/2000 | Casteli et al. | 707/101 |
| 6,047,080 A | * | 4/2000 | Chen et al. | 382/128 |
| 6,119,123 A | * | 9/2000 | Elenbaas et al. | 707/102 |
| 6,226,636 B1 | * | 5/2001 | Abdel-Mottaleb et al. | 707/4 |

* cited by examiner

*Primary Examiner*—Frantz Coby
(74) *Attorney, Agent, or Firm*—Sughrue Mion, PLLC

(57) ABSTRACT

An apparatus for searching a digital image and a method therefor are provided. The digital image search apparatus includes a database processing unit for segmenting an image from the database or an image which is not stored in the database into homogeneous regions and analyzing and storing the segmented regions and an image search engine unit for searching for an image having a segmented region showing a characteristic similar to the characteristic of the query region. It is possible to perform detailed and efficient searching work since it is possible to perform a region-based search by means of segmented regions and a user can perform searching by selecting the characteristic and the position of the segmented regions.

20 Claims, 3 Drawing Sheets

METHOD AND APPARATUS FOR SEARCHING A DIGITAL IMAGE

BACKGROUND OF THE INVENTION

1. Field of the Invention

The present invention relates to a method and apparatus for searching an image, and more particularly, to an apparatus for searching a digital image using characteristics such as the color and texture of the digital image.

2. Description of the Related Art

In general, in conventional image search methods, searching is performed using characteristics such as the color and the texture of an image. Such searching methods are widely used in image search engines. Also, in many cases, the color and the texture of the entire image are used in such search methods. However, in the conventional search methods, the probability of successfully detecting a desired image becomes lower when the size of the image is large and various kinds of objects are included as, for example, in an aerial photograph. Also, since the conventional method extracts the characteristic of an entire image, it takes an excessively long processing time in the case where the image is large in size and the contents thereof are complicate Accordingly, the conventional searching procedure is inefficient.

SUMMARY OF THE INVENTION

To solve the above problem, it is an object of the present invention to provide a digital image searching apparatus for performing a region-based search.

It is another object of the present invention to provide a digital image searching method that utilizes a region-based search.

Accordingly, to achieve the foregoing objects, there is provided a digital image search apparatus, comprising a database processing unit for (1) segmenting an image from the database or an image which is not stored in the database into homogeneous regions, (2) analyzing the segmented regions and (3) storing the segmented regions, and an image search engine unit for searching for an image having a segmented region showing a characteristic similar to the characteristic of a query region.

The image search engine unit preferably searches for a plurality of images having a segmented region showing a characteristic similar to the characteristic of the query region and searches for a region having a position similar to the absolute position or a relative position of the query region in a query image.

The characteristic of the region is preferably one selected from a characteristic group consisting of a color histogram showing the characteristics of colors, Gabor wavelet coefficients showing characteristics of texture, a boundary description showing the characteristic of shape, and a relative and absolute position of the region from anywhere within an entire image or a combination of a plurality of characteristics. Such characteristics may include a color histogram showing the characteristics of colors, Gabor wavelet coefficients showing the characteristics of texture, a boundary description showing the characteristic of shape, and a relative and absolute position from anywhere within an entire image.

To achieve the foregoing objects, there is provided an alternative digital image search apparatus, comprising a database processing unit and an image search engine. The data processing unit comprises region segmentation portion that receives an image and segments the image into homogeneous regions, a region characteristic analyzing portion that analyzes the characteristic of the segmented regions, and an image and region characteristic store for storing the characteristic of each image and region. The image search engine comprises an inputting unit for receiving a query image from a user interface, determining whether the query image is in the database, and outputting the image. The image search engine also includes a selecting unit for outputting the segmented region and the characteristic, the selecting unit being connected to a user interface and receiving a query region and a characteristic, selected by the user. The image search engine further includes a searching unit for searching an image having a segmented region showing a characteristic similar to the characteristic of a query region in the query image and region characteristic store, and outputting searched image information. Finally, the image search engine includes an outputting unit for outputting searched images, where the searched image is the image in a database corresponding to the information of the searched image which is input from the searching unit.

To achieve the foregoing objects, there is provided a digital image search method, comprising a database processing step for segmenting an image from database or a search image which is not stored in the database and analyzing and storing the characteristic of the segmented regions and an image searching step for searching for an image having a segmented region showing a characteristic similar to the characteristic of the segmented region. The database processing step comprises the steps of receiving a database image, segmenting the received image into homogeneous regions, analyzing the characteristic of the segmented regions, and storing the characteristic for each image and region. The image searching step comprises the steps of receiving a search image, determining whether the received image is in the database, restoring characteristic data in each region when it is determined whether the received image is in the database in the determining step, segmenting the input image into homogeneous regions when it is determined that an input image is not in the database in the determining step and analyzing and storing the characteristic of the segmented regions, selecting a query region of a query image and a characteristic to be searched, and searching for an image in the database including a region having a characteristic similar to that of the query region.

BRIEF DESCRIPTION OF THE DRAWINGS

The above objects and advantages of the present invention will become more apparent by the following description in detail of a preferred embodiment thereof with reference to the attached drawings in which.

DESCRIPTION OF THE PREFERRED EMBODIMENTS

Hereinafter, preferred embodiments of a digital image searching apparatus according to the present invention and a method therefor will be described with reference to the attached drawings.

Figure 1:
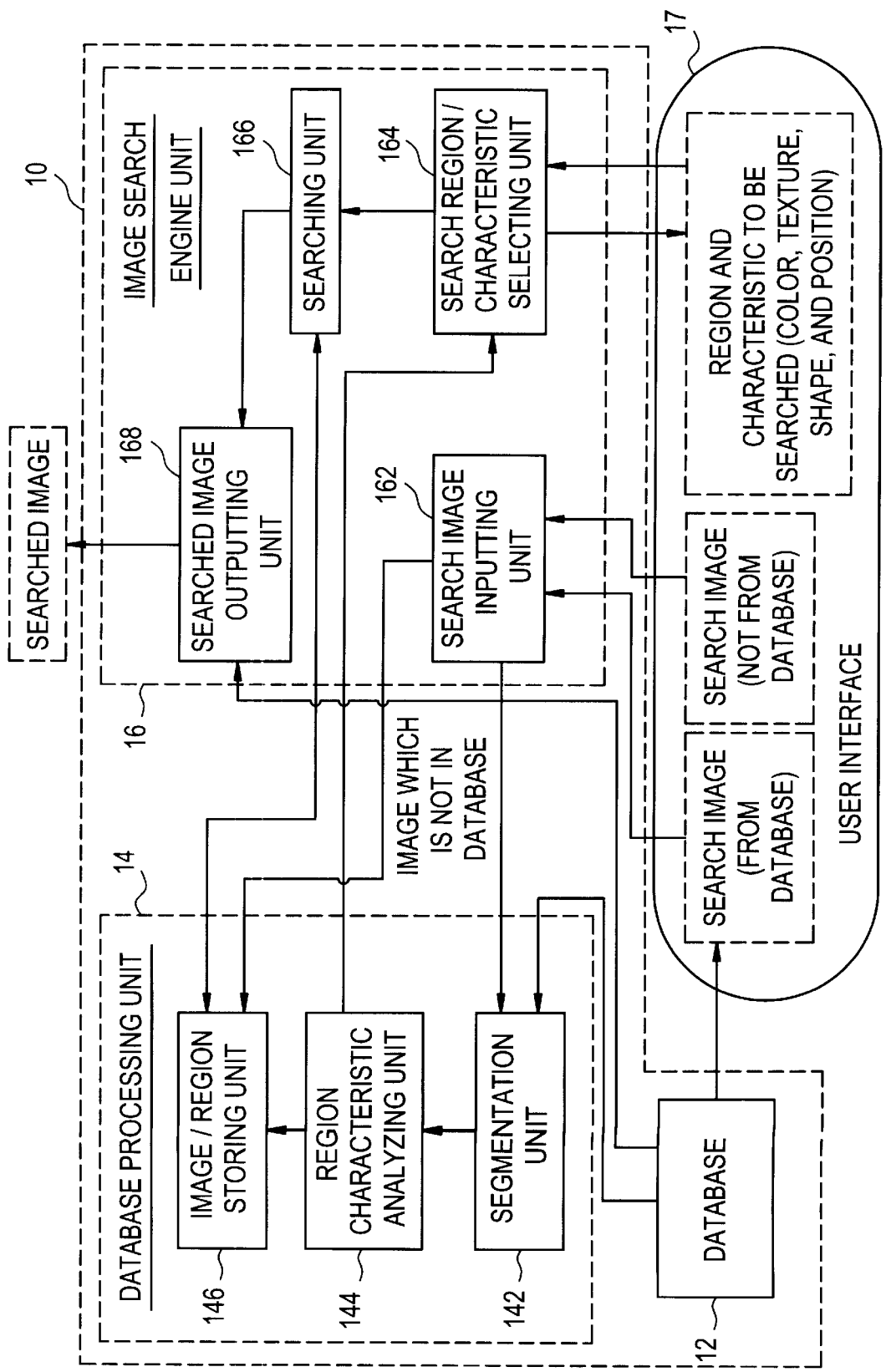
FIG. 1 is a block diagram showing the structure of a digital image searching apparatus according to a preferred embodiment of the present invention.

FIG. 1 is a block diagram showing the structure of a digital image searching apparatus according to the present invention. Referring to FIG. 1, the digital image searching apparatus 10 according to the present invention includes a database 12, a database processing unit 14, and an image search engine unit 16. The database 12 can be provided in a device, in a case where the device is, for example, a personal digital camcorder or camera. However, it need not be provided in a device in case where the database 12 is an image database supplied from an external Internet network. The database processing unit 14 includes a segmentation unit 142, a region characteristic analyzing unit 144, and an image and region characteristic storing unit 146. Also, the image search engine unit 16 includes a search image inputting unit 162, a search region/characteristic selecting unit 164, a searching unit 166, and a searched image outputting unit 168.

The operation of the digital image searching apparatus 10 will be described as follows. The segmentation unit 142 receives an image from the database and segments the image into homogeneous regions. When the search image is an image that is not taken from the database, segmentation of the image can also be performed. To this end, it is possible to use a general segmentation method, such as an edgeflow algorithm, which is well known to one skilled in the art.

The region characteristic analyzing unit 144 analyzes characteristics such as color, texture, and shape of the segmented regions. The color characteristic can be represented by a color histogram displaying the frequency of each color. The texture characteristic can be represented by the Gabor wavelet coefficients, which are obtained in a process of extracting the texture characteristic using a Gabor filter. Gabor filters comprise filters having predetermined parameter values selected in consideration of characteristic scales and orientations. The shape characteristic can be represented by a description of the boundaries. Since the image is segmented into areas in the digital image search apparatus according to the present invention, the absolute positions of the regions that exist in the image or their relative positions with respect to other regions within the image may be used as a characteristic. Therefore, the region characteristic analyzing unit 144 also can analyze the position of the regions in an entire image as a characteristic. In sum, the region characteristic analyzing unit 144 outputs characteristic data such as the color histogram, the Gabor wavelet coefficient, the boundary description, and the position value, for each image and region. The image and region characteristic storing unit 146 stores the characteristic data of each image and region.

The image search engine unit 16 connected to the database processing unit 14 searches images having segmentation areas showing characteristics similar to the characteristic of the segmented query region. This will be described in detail as follows.

The inputting unit 162 receives the image to be searched from a user interface 17, which is capable of directing the search of an image that may or may not be in a database 12, on a selectable basis using various characteristics. When the search image is in the database 12, the image is already segmented into homogeneous areas by the database processing unit 14 and the characteristic data is provided for each region. However, when the search image is not in the database 12, segmentation and characteristic analysis should be performed first. Therefore, the inputting unit 162 outputs the search image after determining whether the search image is in the database.

The selecting unit 164 connected to the user interface 17 outputs the segmented region and characteristic data to the user interface. The user selects the query region and characteristic data with reference to the information on the region and the characteristic output from the user interface 17. The query region and characteristic selected by the user are input to the selecting unit 164. Also, when the search image is not in the database 12, the selecting unit 164 should display the region and characteristic data, which is analyzed by the region characteristic analyzing unit 144, to the user. Therefore, it is preferable that the characteristic data is received from the region characteristic analyzing unit 144.

The searching unit 166 receives the query region and the characteristic data output from the selecting unit 164, searches regions in the database 12, including the segmented region showing a characteristic similar to the characteristic of the segmented region in the image and region characteristic storing unit 146, and outputs images that have regions with similar characteristics as the query region. There is a case in which the user should search a region, which is in a certain position in an image, or a region, which is in a relative position with respect to another region in the image. Therefore, it is preferable that the searching unit 166 detects an image having a segmented region showing a characteristic similar to the characteristic of the query region, receives a position search selection command (not shown) from the user interface, and searches a region in an image having a position similar to the absolute position or the relative position in the image according to the command.

The outputting unit 168 outputs the image received from the database 12, corresponding to the searched image information input from the searching unit 166, as the searched image.

The digital image search apparatus according to the present invention segments the database image into regions and region-based searching is performed by means of segmented regions. Since the user performs searching after selecting the characteristic and the position of the segmented region, it is possible to perform searching work more rapidly and effectively than in an apparatus according to a conventional technology in which the searching is performed with respect to the entire image.

An embodiment of the digital image search method realized in the apparatus will be described. The digital image search method according to the embodiment of the present invention includes a database processing step and an image searching step.

Figure 2:
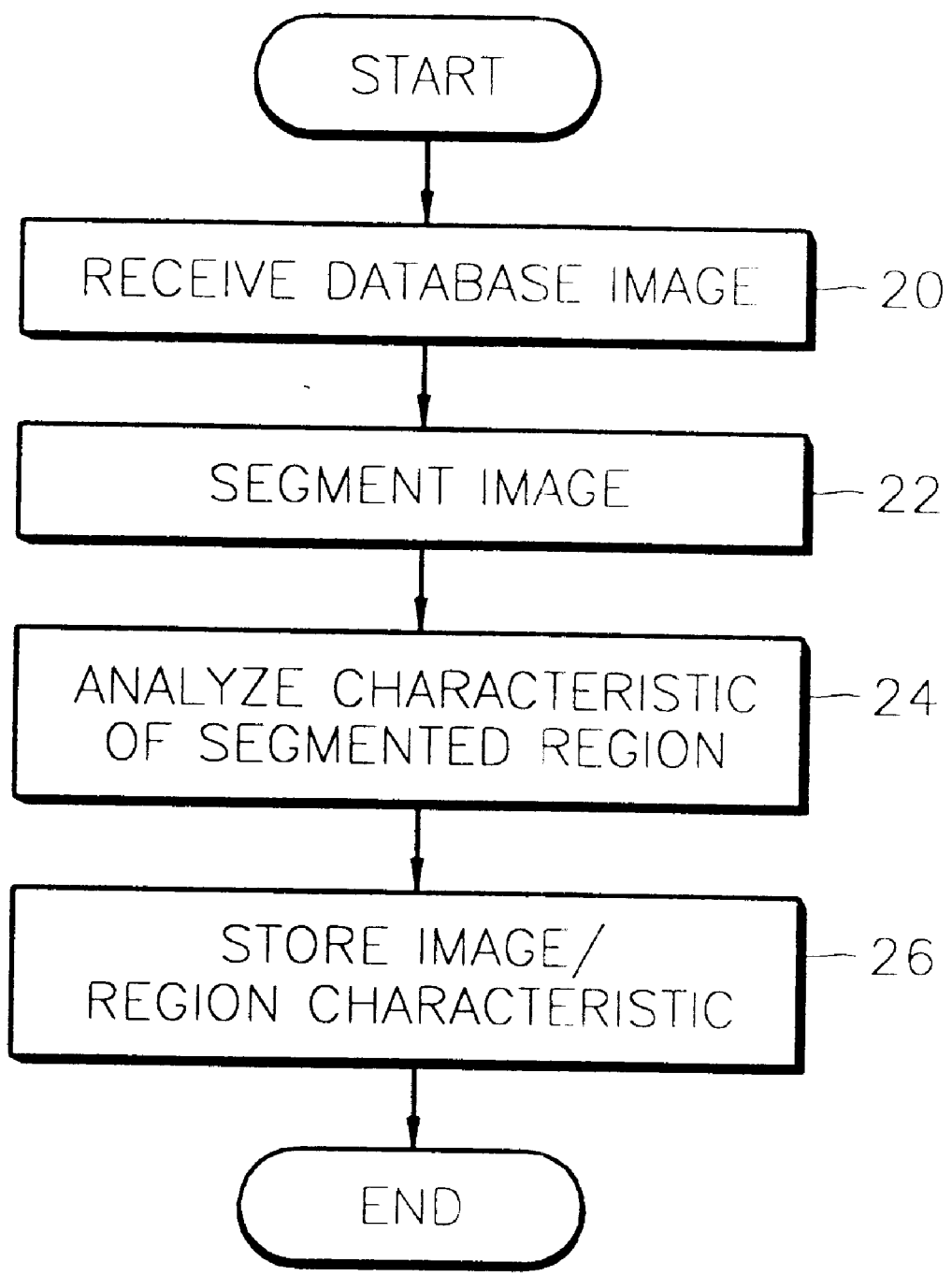
FIG. 2 is a flowchart showing the main steps of performing the database processing step of a digital image searching method according to an embodiment of the present invention.

FIG. 2 is a flowchart showing the main steps in the process of processing a database in the digital image search method according to an embodiment of the present invention. Referring to FIG. 2, in the process of processing the database, a database image is received (step 20) and the received image is segmented into homogeneous regions (step 22). The characteristic of the segmented region is analyzed (step 24) and the characteristic is stored for each image and region (step 26). Since the processing of each step is substantially the same as described with reference to FIG. 1, it will not be described in detail.

Figure 3:
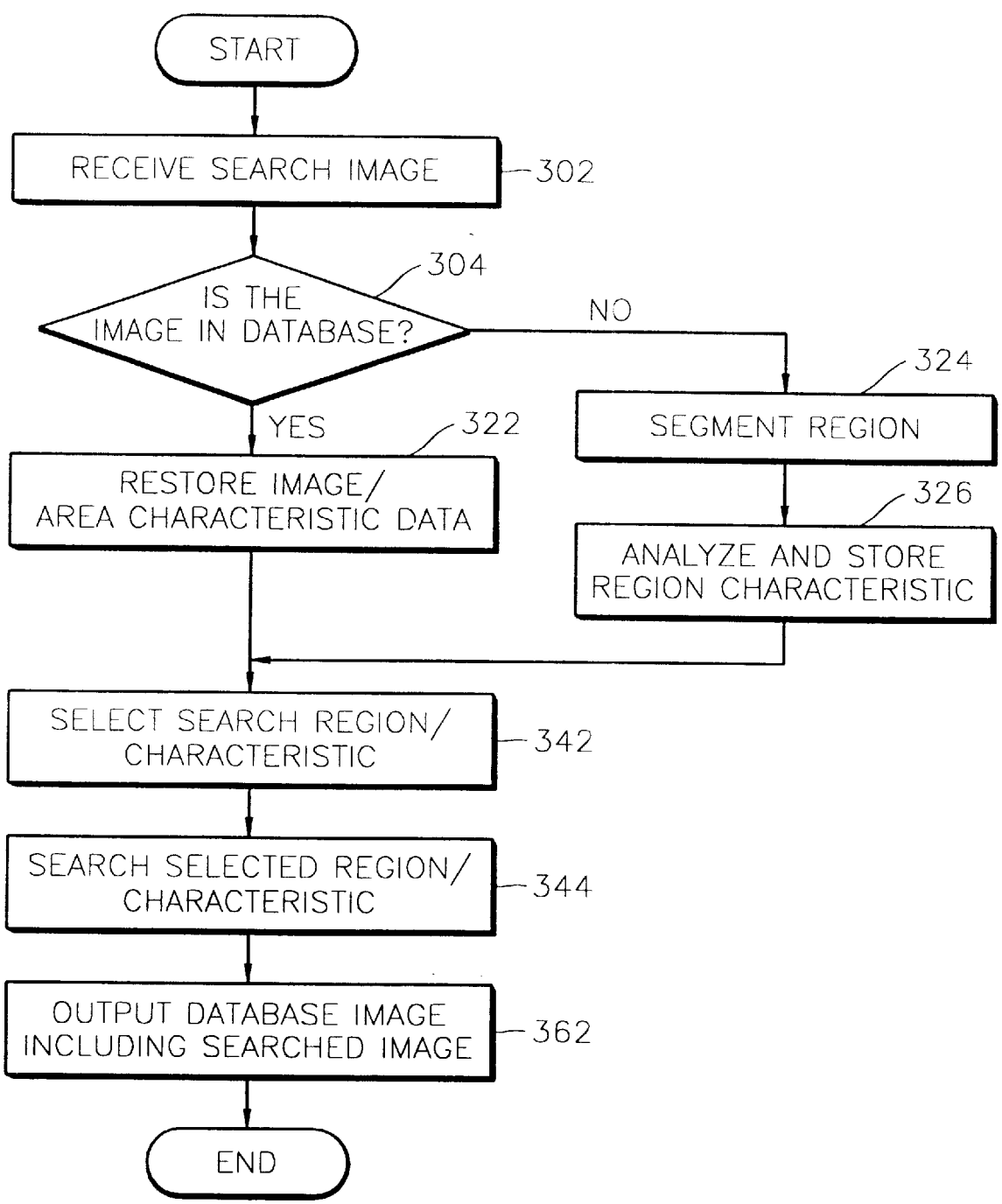
FIG. 3 is a flowchart describing the main steps of a process of performing the image search step of the digital image searching method according to an embodiment of the present invention.

FIG. 3 is a flowchart of main steps of the process of performing the image searching step of the digital image search method according to a preferred embodiment of the present invention. Referring to FIG. 3, in the image searching step, a search image is received (step 302) and it is determined whether the input image is in the database (step 304). When the input image is determined to be in the database in the determining step (304), since the database image is already segmented into homogeneous regions in the database processing step and characteristic data exists, the characteristic data in each region is restored (step 322). When the input image is determined not to be in the database in the determining step (304), the input image is segmented into homogeneous regions (step 324). This is the same step as the segmentation step (22) described with reference to FIG. 2. Then, the characteristics of the segmented regions are analyzed and stored (step 326). Therefore, whether a user inputs a query image, which is in the database, or not in the database, the preparation for search is performed and completed. Then, the query region and characteristic are selected (step 342). Thereafter, a search is done for an image including a region, which has a characteristic similar to that of the query region (step 344). After such a region is searched for, the database image including the searched region is output (step 362). Since the processing of each step is the same as the processing described with reference to FIG. 1, it will not be described in detail.

In the digital image search method according to the present invention, the database image is segmented into regions, and region-based searching is performed by means of the segmented regions, and a user performs searching after selecting the characteristic and the positions of the segmented regions, so that it is possible to perform searching more rapidly and effectively than in a conventional technology in which the detection is performed with respect to the entire image.

Also, the digital image search method according to the present invention can be written into a program, which can be executed in a computer such as an image search routine of an Internet search program. It can be realized in a general digital computer, which operates the program from a medium used in the computer. The medium includes a magnetic recording medium such as a floppy disk or a hard disk, an optical recording medium such as a CD-ROM or a DVD and a storage medium such as transmission through the Internet and a carrier wave. Also, such functional programs, codes, and code segments can be easily estimated by a programmer of a technological field to which the present invention belongs.

As mentioned above, according to the apparatus for searching a digital image according to the present invention and the method therefor, it is possible to perform rapid and efficient searching since region-based searching can be performed by means of the segmented regions and the user can perform searching after selecting the characteristics and the positions of the segmented regions.

The foreign patent application(s) from which priority under 35 USC § 119 is claimed, is (are) incorporated herein by reference. Although the invention herein has been described with respect to specific embodiments, it is not limited thereto, and reference should be made to the claims for a definition of the full scope of the invention in accordance with applicable law.

What is claimed is:

1. A digital image search apparatus for searching for an image from a database in which a plurality of images are stored, comprising:
 a database processing unit operative to segment an image from the database and an image which is not stored in the database into homogeneous query regions and to analyze and store a characteristic of the segmented regions; and
 an image search engine unit operative to search for an image having a segmented region showing a characteristic similar to a characteristic of the query region.

2. The apparatus of claim 1, wherein the image search engine unit searches for a plurality of images having a segmented region showing a characteristic similar to the characteristic of the query region and searches for a region having a position similar to at least one of an absolute position or a relative position of the query region in the query image.

3. The apparatus of claim 1, wherein the characteristic of the region is at least one selected from a characteristic group comprising a color histogram showing the characteristics of colors, Gabor wavelet coefficients showing characteristics of texture, a boundary description showing the characteristic of shape, and a relative and absolute position of the region from anywhere within an entire image.

4. The apparatus of claim 2, wherein the characteristic of the region is at least one selected from a characteristic group comprising a color histogram showing the characteristics of colors, Gabor wavelet coefficients showing characteristics of texture, a boundary description showing the characteristic of shape, and a relative and absolute position of the region from anywhere within an entire image.

5. The apparatus of claim 1, wherein the characteristic is a combination of a plurality of characteristics including a color histogram showing the characteristics of colors, Gabor wavelet coefficients showing the characteristics of texture, a boundary description showing the characteristic of shape, and a relative and absolute position from anywhere within an entire image.

6. The apparatus of claim 2, wherein the characteristic is a combination of a plurality of characteristics including a color histogram showing the characteristics of colors, Gabor wavelet coefficients showing the characteristics of texture, a boundary description showing the characteristic of shape, and a relative and absolute position from anywhere within an entire image.

7. A digital image search apparatus for searching for an image in a database in which a plurality of images are stored, comprising:
 a database processing unit, comprising:
  region segmentation means for receiving an image and segmenting the image into homogeneous regions;
  region characteristic analyzing means for analyzing a characteristic of the segmented regions; and
  an image and region characteristic storing means for storing the characteristic of each image and region, and
 an image search engine, comprising;
  an inputting unit for receiving a query image from a user interface, determining whether the query image is in the database, and outputting the image;
  a selecting unit responsive to the database processing unit for outputting the segmented region and the respective characteristic of the segmented region, the selecting unit also being connected to the user interface and operative to receive data defining a query region and a characteristic selected by the user;
  a searching unit for searching an image having a segmented region showing a characteristic similar to a characteristic of the query region in the query image and in the region characteristic storing means and outputting searched image information; and an outputting unit for outputting at least one searched image, where one of said at least one searched image is the image in the database corresponding to the searched image information which is input from the searching unit.

8. The apparatus of claim 7, wherein the searching unit searches for an image having a segmented region showing a characteristic similar to the characteristic of the query region, receives a position detection command from the user interface, and searches images with regions having a position similar to one of an absolute position or a relative position as the query region in the image according to a command.

9. The apparatus of claim 7, wherein the characteristic is at least one selected from a characteristic group comprising a color histogram showing characteristics of colors, Gabor wavelet coefficients showing characteristics of texture, a boundary description showing a characteristic of shape, and a relative and absolute position of the region from anywhere within an entire image.

10. The apparatus of claim 8, wherein the characteristic is at least one selected from a characteristic group comprising a color histogram showing characteristics of colors, Gabor wavelet coefficients showing characteristics of texture, a boundary description showing a characteristic of shape, and a relative and absolute position of the region from anywhere within an entire image.

11. The apparatus of claim 7, wherein the characteristic is a combination of a plurality of characteristics including a color histogram showing characteristics of colors, Gabor wavelet coefficients showing characteristics of texture, a boundary description showing a characteristic of shape, and a position from anywhere within an entire image.

12. The apparatus of claim 8, wherein the characteristic is a combination of a plurality of characteristics including a color histogram showing characteristics of colors, Gabor wavelet coefficients showing characteristics of texture, a boundary description showing a characteristic of shape, and a position from anywhere within an entire image.

13. A digital image search method for searching for an image in a database in which a plurality of images are stored, comprising:

processing a database in order to generate segmented regions of an image from the database or a search image which is not stored in the database, and analyzing and storing the characteristic of the segmented regions; and searching for an image having a segmented region showing a characteristic similar to a characteristic of a query segmented region, wherein the database processing step comprises the steps of:
receiving a database image;
segmenting the received image into homogeneous regions;
analyzing the characteristic of the segmented regions; and
storing the characteristic for each image and region, and wherein the image searching step comprises the steps of:
receiving a search image;
determining whether the received search image is in the database;
restoring characteristic data in each region when it is determined whether or not the received search image is in the database in the determining step;
segmenting the received search image into homogeneous regions when it is determined that a received search image is not in the database in the determining step and analyzing and storing the characteristic of the segmented regions;

selecting a query region of the search image and a characteristic to be searched; and
searching for an image in the database which includes a region having a characteristic similar to that of the query region.

14. The method of claim 13, wherein the searching step comprises searching for an image having a segmented region showing (1) a characteristic similar to the characteristic of the query region and (2) a position similar to an absolute position or a relative position of the query region in the query image.

15. The method of claim 13, wherein the characteristic is one selected from a characteristic group comprising a color histogram showing characteristics of colors, Gabor wavelet coefficients showing characteristics of texture, a boundary description showing a characteristic of shape, and a relative and absolute position of the query region from anywhere within an entire image.

16. The method of claim 14, wherein the characteristic is one selected from a characteristic group comprising a color histogram showing characteristics of colors, Gabor wavelet coefficients showing characteristics of texture, a boundary description showing a characteristic of shape, and a relative and absolute position of the query region from anywhere within an entire image.

17. The method of claim 13, wherein the characteristic is a combination of a plurality of characteristics including a color histogram showing characteristics of colors, Gabor wavelet coefficients showing characteristics of texture, a boundary description showing a characteristic of shape, and a relative and absolute position of the query image from anywhere within an entire image.

18. The method of claim 14, wherein the characteristic is a combination of a plurality of characteristics including a color histogram showing characteristics of colors, Gabor wavelet coefficients showing characteristics of texture, a boundary description showing a characteristic of shape, and a relative and absolute position of the query image from anywhere within an entire image.

19. A program product comprising a storage media and a computer program operative to perform a digital image search method for searching for an image in a database in which a plurality of images are stored, comprising:

processing a database in order to generate segmented regions of an image from the database or a search image which is not stored in the database, and analyzing and storing a characteristic of the segmented regions; and searching for an image having a segmented region showing a characteristic similar to a characteristic of a query segmented region, wherein the database processing step comprises the steps of:
receiving a database image;
segmenting the received image into homogeneous regions;
analyzing a characteristic of the segmented regions; and
storing the characteristic for each image and region, and wherein the image searching step comprises the steps of:
receiving the search image;
determining whether the received search image is in the database;
restoring characteristic data in each region when it is determined whether or not the received search image is in the database in the determining step;
segmenting the received search image into homogeneous regions when it is determined that the received search image is not in the database in the determining step and analyzing and storing the characteristic of the segmented regions;

selecting a query region of the search image and a characteristic to be searched; and searching for the image in the database which includes a region having a characteristic similar to that of the query region.

20. The program product of claim 19, wherein the program further comprises a searching step comprises searching for an image having a segmented region showing (1) a characteristic similar to the characteristic of the query region and (2) a position similar to an absolute position or a relative position of the query region in the query image.

* * * * *